Jan. 9, 1934.  T. A. B. CARVER  1,943,161

MECHANISM FOR ELECTRICALLY CONTROLLING MECHANICAL MOTION

Filed Oct. 8, 1930  2 Sheets-Sheet 2

INVENTOR
Thomas A. B. Carver,

BY
ATTORNEY

Patented Jan. 9, 1934

1,943,161

UNITED STATES PATENT OFFICE 1,943,161

MECHANISM FOR ELECTRICALLY CONTROLLING MECHANICAL MOTION

Thomas Albert Briggs Carver, Cheadle Hulme, England

Application October 8, 1930, Serial No. 487,359, and in Great Britain December 3, 1929

7 Claims. (Cl. 192—125)

This invention relates to mechanism for determining electrically whether the motion of a revolving shaft or other revolving member shall or shall not be transmitted to effect a certain operation, such as the stopping of a machine, or controlling the admission of motive fluid to engines, the closing or breaking of an electric circuit determining whether the mechanical force supplied by the revolving shaft or the like shall or shall not be made to effect the operation which it is intended to perform.

Apparatus of this character is known and has been described, for example, in United States Patent Specification No. 724,307, but such apparatus has always been dependent for its action upon an external supply of electrical energy at a suitable voltage.

One object of the present invention is to provide mechanism for electrically controlling mechanical motion which is not dependent upon an external supply of electrical energy, and with this object the mechanism is arranged to include in a unitary structure a revolving shaft, a generator of electrical energy and the electromagnet or magnets whereby the controlling action of the mechanism is effected.

Figure 1:
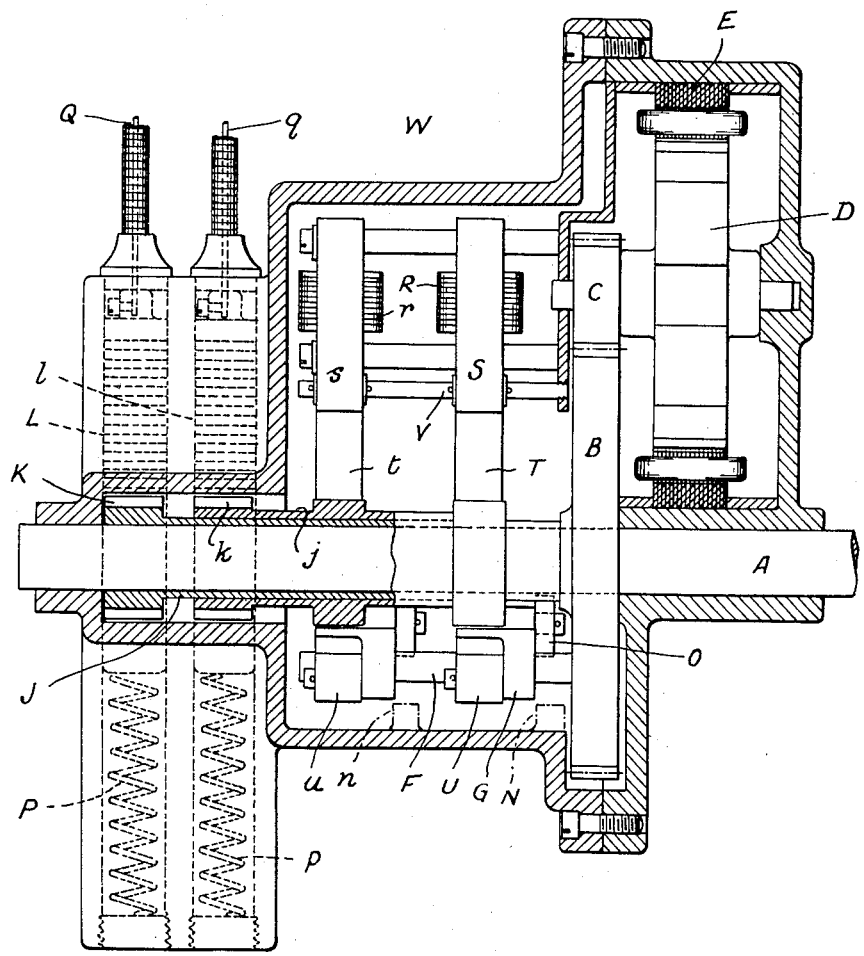
Figure 2:
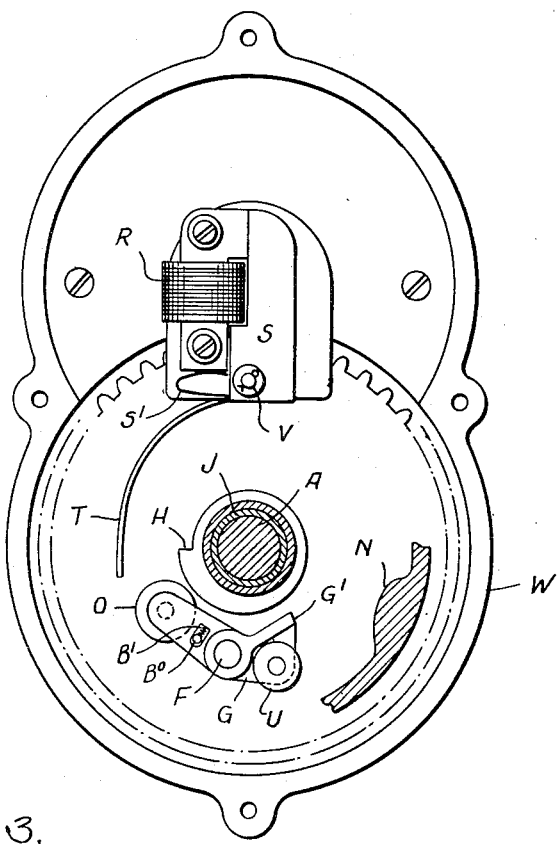
Figure 3:
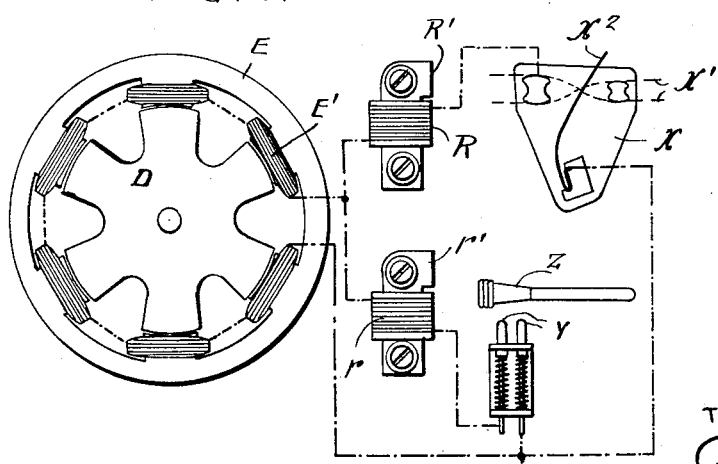

One embodiment of the invention is illustrated in longitudinal and transverse section respectively in Figs. 1 and 2 of the accompanying drawings, while Fig. 3 is a diagrammatic view showing the energizing circuit connections.

In these drawings A represents the main shaft of the controlling mechanism, and this shaft is rotated through any suitable gearing from any convenient revolving member of the machine to be controlled. The shaft A is connected through suitable gears B, C with the rotor D of a small electrical generator. This generator may be of any suitable known type, but to avoid the inconveniences of a commutator and brushes it is preferred to use a generator the rotor of which is a permanent steel magnet with two, four or more poles, while the stator is a laminated ring E with poles and coils to correspond.

Parallel with the main shaft A and rotating with it is a pivot pin F which may conveniently be driven into a hole bored in the gear wheel B normal to its plane of rotation.

Mounted upon the pivot pin F with freedom to rock through the necessary range is a pawl G, the nose G' of which moves in a circular path around the axis of the main shaft A. So long as the nose of the pawl G remains in its outer position it will rotate with the shaft A without coming into engagement with a projection or step H on a sleeve J which is loose on the main shaft, but when the nose of the pawl G occupies its inner position it moves in a circular path of smaller diameter and then is in a position to engage the projection H, so that the sleeve J is carried around as the shaft A continues to rotate.

The sleeve J has a pinion K fast on it, and this pinion gears with a rack L, which is thus moved rectilinearly in suitable guides by the rotation of the sleeve. When the sleeve has been rotated by the pawl G through a part of a turn (e. g. about two thirds of a revolution), a roller O on the tail of the pawl comes into engagement with a projection N from the fixed housing or casing, and in consequence the pawl is turned upon the pivot shaft so as to throw the nose G' outwardly into a position in which it rotates clear of the projection H. A spring P operates to return the rack L and consequently the sleeve J to their initial positions. The movement of the rack can be transmitted through a flexible or other mechanical connection indicated at Q to pull off the starting handle of the machine to be controlled, or effect any other operation it is intended to perform.

Whether the mechanical force supplied by the revolving shaft shall or shall not be transmitted to effect the operation it is intended to perform is thus determined by whether the pawl G is or is not thrown into the position in which it engages the sleeve J to rotate it, and this is determined by providing an electromagnet R to control the movement of an armature S about its pivot V.

As shown in Fig. 2, the electromagnet is of the bar type with a laterally projecting pole end R', against the face of which the opposing face of the end S° of the pivoted armature S normally rests, being urged towards this position by a spring S' which is in compression between the butt end of the magnet and an arm T projecting from the tail end of the armature S.

A roller U on the pawl G engages once per revolution the arm T which projects from the tail of the armature S into the path of the roller, and displaces this arm outwardly, thereby turning the armature S upon its pivot V against the action of the return spring S'. The friction of the pawl G upon its pivot is arranged to be sufficient to overpower the strength of the spring S', but insufficient to overcome the spring plus the attractive force upon the armature of the electromagnet R when the latter is energized. Alternatively, the restraining force on the pawl G may be due to a spring such as the spring B' anchored to a pin B° extending from the gear wheel B and pressing against the pawl G in the appropriate direction. Consequently, when the magnet R is energized the nose G' of the pawl will be depressed into its inner or operative position when the roller U encounters the arm T projecting from the armature S.

Assuming that the mechanism is to be applied to the stoppage of a loom upon the breakage of a warp thread, the action is as follows:—

While the loom is running normally, the main shaft of the mechanism rotates at the required speed and drives the electrical generator. When a warp thread X' breaks, the circuit (Fig. 3) including the stator windings E' of the generator and the electromagnet is automatically closed by any suitable detecting device such as the flexed wire $X^2$ of the well known spring wire detector indicated at X (Fig. 3) and described in United States patent specification No. 740,672, the electromagnet R is energized and its armature attracted to throw the pawl G into the position in which its nose strikes the projection H on the sleeve J, thereby causing the sleeve to be rotated and to drive the rack which, through suitable transmitting mechanism Q, effects the operation it is intended to perform, such as stopping a loom.

A device such as that above described may also be applied to controlling the weft-replenishing device of a loom, the circuit (see Fig. 3) of the electrical generator E and controlling electromagnet r being in this case automatically closed as when the weft in the shuttle has become exhausted to a predetermined extent, by means of the well known feeler action in which contact is made between feelers Y and a metallic portion of the bobbin tube or pirn Z (here shown out of contact with feelers Y) upon which the weft is wound.

When it is desired to control both operations, the mechanism hereinbefore described is duplicated with the exception of the electric generator D, E and its driving shaft A, the housing W being suitably extended to enclose the duplicate mechanism.

Fig. 1 of the drawings shows such a dual control apparatus, and the corresponding parts are identified by the same reference characters. It will be noted that while one of the sleeves J is freely mounted on the shaft itself, the second sleeve j is loose around the first sleeve.

Clearly the mechanism described can be modified to perform more than two operations, whether applied to looms or to the control of other mechanisms.

Having thus described the nature of the said invention and the best means I know of carrying the same into practical effect, I claim:—

1. An apparatus of the character herein referred to, wherein the mechanism controlling the operation to be effected includes in a unitary structure a rotating shaft, an electrical generator driven therefrom, an electromagnet adapted to be energized by current derived from said generator, a movable element governing the operation of the apparatus to be controlled, a clutch device rotating with said shaft, and means governed by the energizing of the electromagnet operating to connect the said clutch device with the said movable element.

2. Mechanism of the character herein referred to, comprising in a unitary structure, a shaft rotated by the mechanism to be controlled, an electrical generator driven from said shaft, an electromagnet adapted to be energized by current derived from said generator, a pivot rotating with said shaft, a pawl adapted to rock on said pivot, a sleeve normally free to rotate coaxially with said shaft, means governed by the energizing of the electromagnet operating to bring said pawl into engagement with said sleeve and cause it to rotate, and means actuated by the rotation of said sleeve to transmit mechanical movement to the apparatus to be controlled.

3. An apparatus of the character herein referred to, comprising in a unitary structure a driving shaft, an electrical generator driven therefrom, an electromagnet adapted to be energized by current derived from said generator, a sleeve loosely mounted around the said shaft, a clutch member on said sleeve, a pivot pin rotating with said shaft, a second clutch member pivotally mounted on said pin, means operating to keep the second clutch member normally out of engagement with said first clutch member, means governed by the energizing of the said electromagnet operating to bring the two clutch members into engagement and cause rotation of said sleeve, and means operated by the rotation of said sleeve adapted to transmit mechanical movement to the device to be controlled.

4. An apparatus of the character herein referred to, comprising a clutch device, an electromagnet controlling the operation of the clutch device, a pivoted armature forming part of said electromagnet yieldingly held in contact with the pole pieces of said electromagnet and means actuated by an element of said clutch device adapted to turn said armature upon its pivot.

5. An apparatus of the character described, comprising a pivoted clutch device, an electromagnet, a pivoted armature normally in contact with the pole of said electromagnet, an element of said clutch device adapted to turn said armature upon its pivot and operating to prevent the said armature from being turned upon its pivot by the said clutch device except when the said armature is energized.

6. An apparatus of the character herein referred to, comprising a pivoted clutch device, an electromagnet controlling the operation of the clutch device, a pivoted armature forming part of said electromagnet, means operating to hold said armature yieldingly in contact with the pole pieces of the electromagnet, and means acting upon said pivoted clutch device adapted to prevent its rotation upon its pivot.

7. An apparatus of the character herein referred to, comprising a pivoted clutch device, an electromagnet controlling the operation of the said clutch device, a pivoted armature forming part of said electromagnet, means operating to hold the said armature in contact with the pole pieces of said electromagnet, a member attached to said armature adapted to engage the pivoted clutch device, and means restraining the oscillation of said clutch device upon its pivot, said restraining means being sufficiently powerful to prevent oscillation of the pivoted clutch device upon its pivot except when the clutch device engages the element attached to the pivoted armature and when the electromagnet is energized.

THOMAS ALBERT BRIGGS CARVER.